United States Patent [19]
Pohl et al.

[11] 3,997,795
[45] Dec. 14, 1976

[54] ARRANGEMENT FOR CONTROL OF AERIAL CAMERAS

[75] Inventors: Hans-Joachim Pohl; Otto Weibrecht; Ulrich Wiesenburg, all of Jena, Germany

[73] Assignee: Jenoptik Jena G.m.b.H., Jena, Germany

[22] Filed: Apr. 23, 1975

[21] Appl. No.: 571,008

[30] Foreign Application Priority Data

May 13, 1974 Germany ............................ 178451

[52] U.S. Cl. ............................... 250/578; 250/558; 354/66
[51] Int. Cl.² ....................................... H01V 39/12
[58] Field of Search ................. 356/12, 28; 354/65, 354/66, 70; 250/578, 558

[56] References Cited
UNITED STATES PATENTS

| | | | |
|---|---|---|---|
| 3,144,497 | 8/1964 | Hamilton | 356/28 |
| 3,163,098 | 12/1964 | Kierstead, Jr. | 354/66 |
| 3,500,050 | 3/1970 | Hillman | 354/70 |
| 3,511,151 | 5/1970 | Hillman | 354/65 |
| 3,819,940 | 6/1974 | Laws | 250/578 |

*Primary Examiner*—David C. Nelms

[57] ABSTRACT

In an arrangement for control of aerial cameras an objective for imaging a surveyed area onto a projection plane is employed. The image frequency and the drift are determined from the speed and the direction of the image motion on the projection plane, whereas the grey values are exploited for the exposure setting of the camera. The obtained parameters are used for controlling the camera. The projection plane is covered at least partially by one or more than one digital photo detector matrix. The signals produced are fed into an information processing stage connected to the photodetector matrix for being processed in accordance with a preselected program. An output unit controls the camera in dependence of the processed signals. The projection plane can be arranged in the image plane of the camera objective and can be employed to evaluate the entire photogram.

2 Claims, 4 Drawing Figures

ARRANGEMENT FOR CONTROL OF AERIAL CAMERAS

This invention relates to an arrangement for control of aerial cameras, wherein an objective images a surveyed area onto a projection plane and the picture frequency and the drift are determined from the speed and direction of the motion of the pictures on the projection plane, and/or the exposure time from the density differences (grey values). The obtained parameters are transferred to the camera, which is accordingly set.

In conventional arrangements of the type, drift adjustments, exposure time settings and picture frequencies are continuously supervised and manually corrected by an operator.

The supervision and control of said parameters has to be carried out under complicated environmental conditions in the plane, particularly at considerably low temperatures. Therefore the photographing from plane will only yield optimum results, when the parameter adjustments or settings can be controlled simultaneously and centrally in a control-device.

However, most of the previous control devices do not permit a simultaneous control due to the numerous settings required, which have to be performed in some cases manually. Therefore exertions had been made to automate a part of the controls, corrections and settings, particularly the picture frequency, the drift and the compensation of the relative image motion, in order to reduce manual operations and to ensure synchronism.

Heretofore, it was not possible to entirely reduce manual operations with the ensuing inefficiencies and inconveniences, and partially automatical devices of the conventional types, such as electron beam tubes, vidicons and electronical storage tubes require considerable expenditures, to make them suitable for processing the output data in correction operations. Gear elements have to be exchanged manually in the drive mechanisms of an aerial camera, when a certain picture frequency of superposition is desired.

It is an object of the present invention to obviate the above disadvantages.

It is a further object of the present invention to provide an arrangement for control of aerial cameras, which automatically offers digital data from all corrections required for setting aerial cameras at a leat possible expenditure, and which substantially eliminates manual operations.

It is still a further object of the invention to provide an arrangement for control of aerial cameras which permits installation in said cameras.

According to the invention the projection plane is at least partially covered by at least a matrix of photocells for producing digital data, which cells are connected to a data processor for processing the data derived from said matrix in accordance with a respective program.

There is further provided an output unit which passes on the processed data to the aerial camera.

Preferably, two matrices of photocells are arranged on the projection plane at a spaced relation to each other which depends on the desired correction precision.

The photocell matrices are arranged in lines substantially at right angles to the flight directions.

With a modification one photocell matrix can cover the entire projection plane, wherein two parallel parts of said matrix, which are located non-adjacent, are employed to derive the correction data for setting the camera, and which notwithstanding permit a digital evaluation of an image produced by the aerial camera objective on the projection plane.

This kind of taking aerial photograms has the considerable advantage to eliminate errors occuring in moving cameras and caused by the imaging optical system and by the film. An automatical and simultaneous control of the picture frequency, the drift, the exposure time and the relative motion of the image relieves the pilot and permits him to concentrate on a central control of the aerial photographing system and on his navigational duties.

A further advantage results from combining the components which adjust the image angle of the camera objective and the desired superposition ratio in a single multiplicator, rather than separately by two multi-stage gears.

The digital photocell matrices are used as measuring and scanning means in the present invention. Furthermore they are responsible for sensing the digital image correlations and for the electronic balance of contrast.

In order that the invention may be more readily understood reference is made to the accompanying drawings which illustrate diagrammatically and by way of example three embodiments thereof and in which:-

Figure 1:
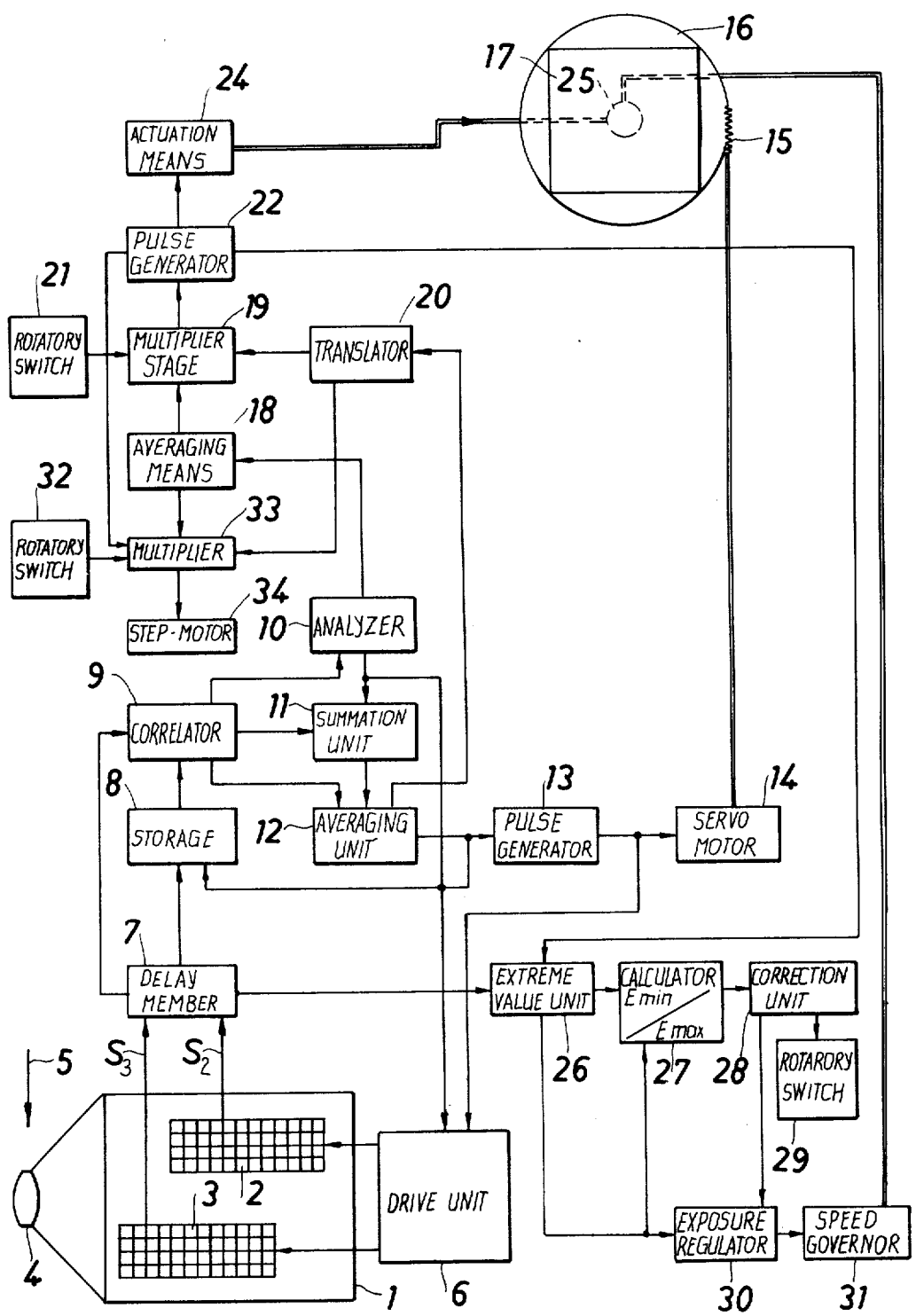
FIG. 1 is a block scheme of a control arrangement for aerial cameras

In FIG. 1 two digital matrices constituted of photocells 2; 3 are arranged on a projection plane 1, which lies in the image plane of an objective 4, shown for reasons of representation beside the projection plane 1, correctly, it should be located beneath or above said plane 1 (drawing plane). An image (not represented), produced by the objective 4 on the projection plane 1 moves, due to the flight movement of the entire system described herein in a direction indicated by an arrow 5, from a matrix 2 to a matrix 3; on passing a same detail of said image optical signals are converted into electrical ones, at first in the matrix 2 and then in the matrix 3.

A drive unit 6 senses the pulses, if any, produced in the cells of matrices 2, 3 and feeds them into a delay member 7, where the simultaneously arriving pulses from both outputs of the matrices are delayed relative to each other.

A storage 8 accumulates the pulse sequence $S_2$ from the matrix 2, for a later transport to a correlator 9.

The pulse sequence $S_3$ from the matrix 3 is directly fed into the correlator 9, where it is continuously compared to the stored pulse sequence $S_2$ and the displacement $\tau$ of the pulse sequences derived from the images are determined as well as the correlation coefficient $\rho_K(\tau)$.

The correlator 9 is followed by an analyser 10 for determination of the maximum value $\rho_{max}$ of the correlation coefficient $\rho_K(\tau)$, as well as of the corresponding time.

In a next step the storage 8 is erased and a new sensing operation of the matrices 2 and 3 is started via the analyser 10 and the drive unit 6.

A summation unit 11 is connected to the correlator 9 and to the analyser 10 to determine the sum $\bar{\tau}$ out of the value $\tau$, derived from the correlator 9, and out of the value $\tau'$, derived from the maximum correlation coefficient $\rho_{max}$.

An averaging unit 12 following the summation unit 11, averages the sum $\bar{\tau}$ over a period $T_M$ to obtain an average value $\bar{\tau}$. The period $T_M$ is substantially defined by the flight altitude, the speed of the plane and the photographing focal length. The average sum $\bar{\tau}$ is fed into a pulse generator 13, which in turn, in dependence from the sum $\bar{\tau}$, delivers a pulse for driving a servo-motor 14.

When the servo-motor 14 is operative, the sensing operation of the matrices 2 and 3 is interrupted and the storage 8 is erased.

The servo-motor 14 displaces a mount 16 of a camera 17 via a gear means 15 in a plane which lies parallel to the drawing plane. In this manner the drift is automatically corrected.

Figure 2:
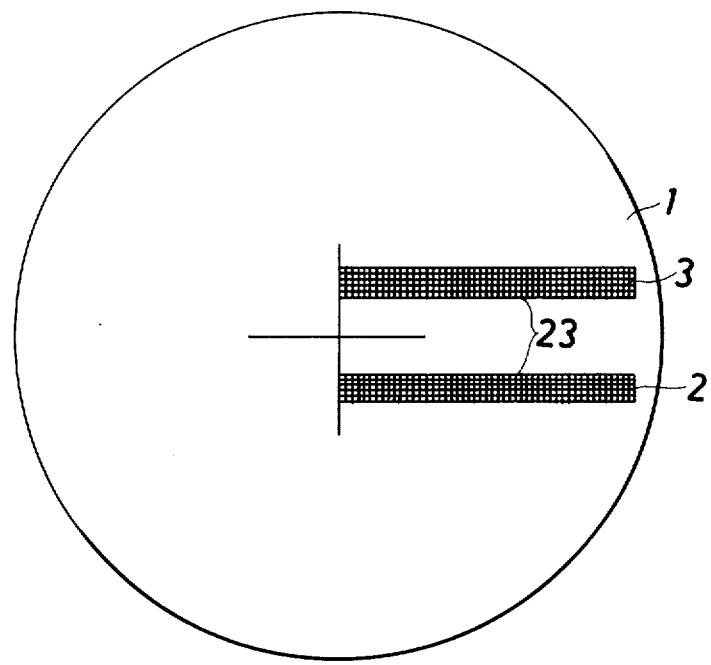
FIG. 2 shows a projection plane of a control arrangement.

In FIG. 2 two matrices 2, 3 are arranged on the projection plane 1, each of which comprises four rows of fifty elements each. When, for example, an image detail passes the 23rd element in the first row of the matrix 2 and the same element in the fourth row of matrix 3, that is, the image detail does only move in the 23rd column of both matrices, than no drift has occured. When the image detail leaves the column 23, then a signal will result which actuates the servo-motor 14 for carrying out a drift correction.

It is of importance, in which degree and direction the pulse sequences, derived from the matrices 2 and 3, are displaced relative to each other, if any, and in which row the correlation occures, because this is what matters in a respective correction of drift.

In FIG. 1 a further averaging means 18 is connected to said analyser 10 for averaging the informations, derived from the sensed matrices 2, 3 in a period $T_M$, the resulting average value $\bar{z}$ is fed into a multiplier stage 19.

A translator 20 forms the cosine $\alpha$ of the averaged sum in accordance with the angle of drift $\alpha$ for a further processing in the multiplier stage 19.

And finally, a correction coefficient $k = f(c_K, p, \nu)$ is fed into a multiplier stage 19 via a rotary switch 21. The correction coefficient $k$ is constant with respect to each aerial photographing flight and depends on a given camera constant $c_K$ and the desired degree of superposition, and can be taken from a conventional table.

$\nu$ is the counting frequency of the drive unit 6. The result from the multiplication, $\Delta t = k \cdot \bar{z} \cdot \cos \alpha$ is fed into a pulse generator 22, which sends a pulse after $\Delta t$ to the actuation means 24 operating a shutter 25 of the camera 17.

The automatical evaluation, respectively, control of the image frequency and of the superposition functions correlates two pulses from two different rows of the matrices 2 and 3 with the intention to detect the time in which an image detail has moved from one row to the other one.

A unit 26 for finding extreme values analyses the maximum and minimum voltages from the pulse sequences $S_2$ and $S_3$ from both matrices 2 and 3 in order to obtain signals for a control of the exposure time.

The pulse generator 22 controls stop or start of said unit 26 by feeding respective pulses thereinto.

A calculator 27 forms a quotient out of the extreme values of the image brightness $E_{min}/E_{max}$ for the individual image details.

An exposure value H, taken from any suitable table, is fed via a rotary switch 29 into a correction unit 28, where it is corrected in dependence of the quotient $E_{min}/E_{max}$.

An exposure regulator 30 determines the exposure time $t$ in accordance with the relation $\log t = H - \log E_{min}$, and feeds a respective pulse into a speed governor 31 which in turn controls the lamina of the shutter 25. The average value $\bar{z}$ from the averaging means 18 can also be used to automatically control the balance of image drift.

An image drift compensation is necessary when considerably long exposure times are involved to eliminate any lack of definition in the course of photographing, caused by the speed of the plane, which in turn causes the relative movement of the image in the image plane during the period of exposure.

The compensation is performed when the camera objective (not shown) moves relative to the image plane during the exposure. The speed of this movement must, of course, coincide with the image drift speed.

Alternatively, the image plane of the camera may be displaced relative to the objective.

In this manner the imaged picture points definitely appear as points in the image plane, inspite of the camera movement caused by the speed of the plane relative to ground during the exposure.

Since the sum $\bar{z}$ has been obtained by using a known frequency, it is an equivalent of a time measurement.

When the sum $\bar{z}$, derived from the averaging means 18, $\cos \alpha$ obtained by the translator 20, and the constant $$O = \frac{f_K}{f_{St}} \cdot s \cdot \nu = f(\nu) \text{ via the rotary switch 32,}$$

are all fed into a division calculator or, generally, a multiplier 33, said multiplier permits the calculation of a correspondingly transformed information, which is exploited for control of a step-motor 34. In the equation $s$ is the distance between matrix 2 and matrix 3, $\nu$ the counting frequency, $f_K$; $f_{St}$ the focal lengths of the camera 17 objective, respectively, of the control unit 4.

The pulse generator 22 feeds a pulse into the multiplier 33, which in turn delivers its informations to a step-motor 34 installed in the aerial camera 17; the step-motor 34 performs the relative movement between image plane and objective at the moment of the shutter release.

For reasons of simplicity, the drawing shows the step-motor 34 separated from the aerial camera.

Figure 3:
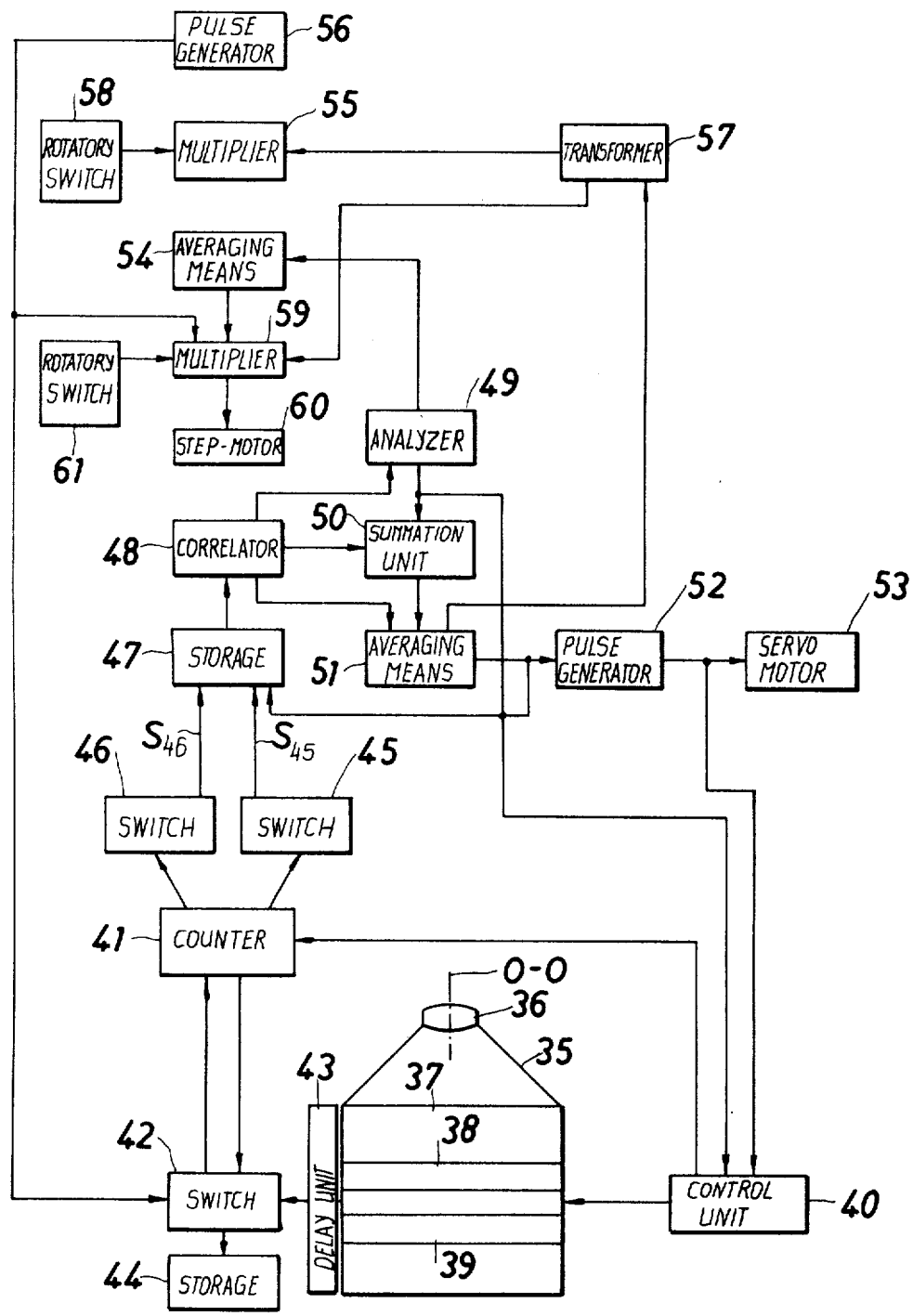
FIG. 3 is a block schematic view of a control arrangement in connection with an aerial camera, and FIG. 4 a block schematic view of a control arrangement in co-operation with an electronic means for balance of contrast.

In FIG. 3, a projection plane 37 is associated to an objective 36 of an aerial camera 35. The objective 36 has an optical axis O—O.

The projection plane 37 is covered by a photocell matrix, portions 38, 39 of which produce signals for an automatic control of the drift correction, the image frequency and the balance of the image movement. In its entity the matrix is adapted to evaluate the informations contained in the images and to produce digital pulses thereof.

The projection plane 37 and the coincident photocell matrix are arranged in the drawing plane, and the photographing objective 36 is shown to lie in parallel to the optical axis O—O for reasons of representation.

A control unit 40, already mentioned in connection with FIG. 1 pulses the photocell matrix 37, respectively the parts 38 and 39 thereof.

The start of operation of the control unit 40 also initiates a programmed counter 41 (the same in FIG. 4), which is connected via a switch 42 and a delay unit 43 to the matrix 37. The matrix output signals which contain informations about position and/or grey values are transferred to a storage 44 via said switch 42 and said delay unit 43, where the contents of the scanned images is recorded as digital informations. Simultaneously, the program controlled counter 41 gets said informations for automatically controlling the aerial camera 35, to which the objective 36 and the matrix 37 are integral components, respectively, associated ones. After the sensing operation of the entire matrix 37 the counter 41 sends a respective stop pulse to the switch 42 for blocking the image recording operation in the storage 44, and only pulses are transferred to the counter 41. Said counter 41 effects the information transport from the part 38 of the matrix.

It further controls the OFF or ON state of a subsequent switch 45 at the start and end of the sensing operation of the part 38.

Furthermore, the counter 41 ensures the transport of the informations obtained from the rows of the matrix part 39 as well as the ON or OFF state of a switch 46, which lies parallel to the switch 45 and subsequent to the counter 41. The switches 45 and 46 either via a storage 47 or directly feed pulses $S_{45}$, respectively $S_{46}$ to a correlator 48, which, in analogy to FIG. 1, is followed by an analyser 49, a summation unit 50, an averaging means 51, a pulse generator 52 and a servo-motor 53 for drift compensation.

Also in analogy to FIG. 1, an averaging means 54 including a multiplier 55 and a pulse generator 56 for automatical control of the picture superpositioning of two subsequent photograms, are connected to an analyser 49.

The connection between the averaging means 51 and the multiplier 55 is established via a transformer 57.

A rotary switch 58, just as in FIG. 1, permits the manual introduction of a constant K.

A multiplier 59 is connected to the averaging means 54, the pulse generator 56 and the transformer 57, for attaining an image drift compensation, in analogy to FIG. 1, in co-operation with a step-motor 60.

A rotary switch 61 permits the introduction of another constant into the multiplier 59.

The program controlled counter 41 is adapted to keep the switch 45 closed until the analyser 49 has produced the result of correlation and counting, as in FIG. 1, and to maintain the switch 46 in the ON-state, when in the course of a sensing operation, the rows of the matrix part 39 are sensed. Since the digital image recording system does not employ a conventional camera shutter, the pulse generator 56 is not connected to a camera shutter, but to the switch 42 which turns the storage 44 into the ON-state when a respective pulse from the pulse generator 56 arrives, to enable the recording of the matrix contained informations.

The switch 42 operates in the manner of a camera shutter. An exposure control is not required in a digital image recording system.

Figure 4:
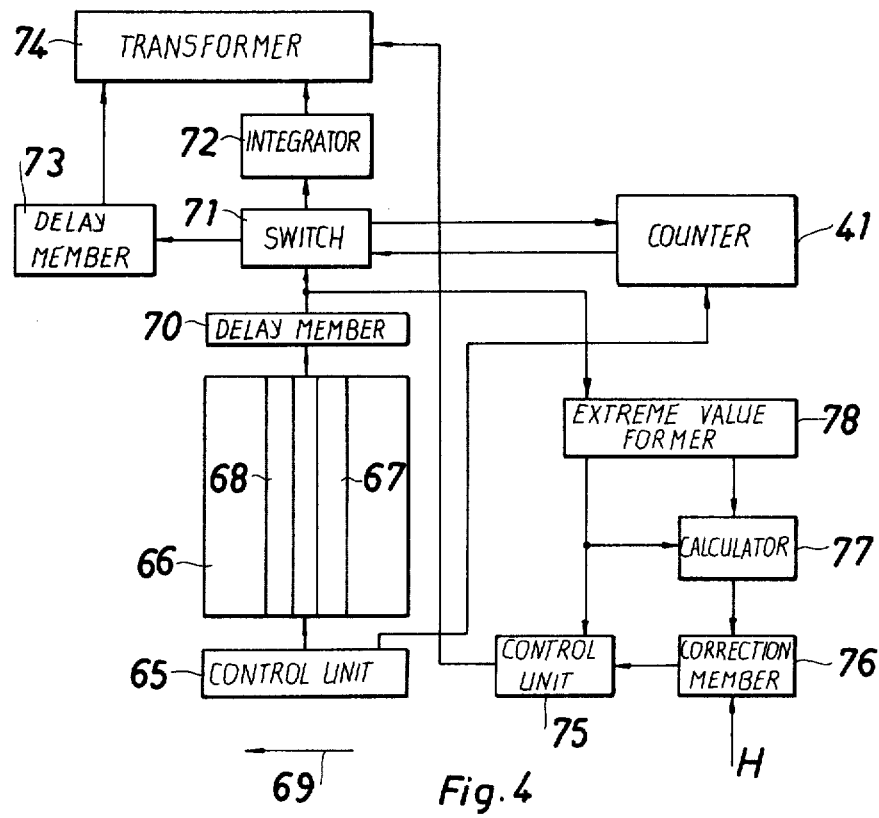

FIG. 4 shows the essential parts of a digital recording system including means for an electronical balance of contrast. A control unit 65 is adapted to sensing a photocell matrix 66 in accordance with a respective program.

The entire projection plane is covered by the matrix 66 from which two sections 67, 68 are particularly displayed. The informations are sensed in groups to reduce the coarse contrast and to increase the contrasts of details. The direction of image movement relative to the entire matrix 66 is indicated by an arrow 69.

The signals from matrix 66 arrive via a delay member 70 and a switch 71 groupwise at both an integrator 72 and a delay member 73.

The integrator 72 averages the digital grey values to respective groups of matrix elements, and feeds them into a transformer 74.

The delay member 73 transports the entire informations from the switch 71 to the transformer 74 and simultaneously delays the transport by a time which is required by the integrator 72 to perform the averaging.

An exposure control unit 75 is connected to a transformer 74, similar to FIG. 1, via a correction member 76, a calculator 77 and an unit 78 for formation of the extreme value. The transformer 74 analytically transforms the digital grey values from the individual elements of a square group in such a manner that a balance of contrast is obtained with respect to a coarse contrast within a group, without essentially varying the contrast in details.

After formation of the difference between the mean grey values $M_s$ of an entire image, derived from the exposure control unit 75, and the mean grey value $m_s$ of a group of elements, the transformed grey values s' are added to said difference in the transformer 74 so that they enter into the values $s'' = s' + (M_s - m_s)$.

The digital information s'' obtained in this manner in the transformer 74, are finally stored in a storage (magnetic tape). When laying out the arrangement on CCD (charge coupled device) basis the delay elements 7, 43 and 70 can be omitted.

We claim:-

1. An arrangement for determination of the image frequency, the drift and the exposure time for consequential setting of an aerial camera, comprising
    an objective,
    a projection plane,
    said objective being adapted to image a surveyed area upon said projection plane,
    at least one matrix of photoelectrical detectors for at least partial conversion of the image on said projection plane into electrical signals,
    said matrix covering said projection plane at least partially, an information processing member being connected to said photo-electrical detector matrix for processing the signals derived from said matrix in accordance with a preselected program, and at least one output member, for feeding the processed signals to said aerial camera,
    said output member being connected to said information
    processing member to said aerial camera.

2. An arrangement as claimed in claim 1, wherein the projection plane is coincident with the image plane of said aerial camera.

* * * * *